United States Patent

[11] 3,608,072

[72] Inventor Bernard L. Berger
 La Crosse, Wis.
[21] Appl. No. 809,372
[22] Filed Mar. 21, 1969
[45] Patented Sept. 21, 1971
[73] Assignee The United States of America as
 represented by the Secretary of the Interior

[54] FISH TOXICANT COMPOSITIONS AND METHOD OF USING THEM
 2 Claims, No Drawings
[52] U.S. Cl. .................................................. 424/121,
 424/225
[51] Int. Cl. ......................................... A01n 9/02,
 A01n 9/36, A01n 23/00
[50] Field of Search ............................... 424/121,
 225; 167/13

[56] References Cited
UNITED STATES PATENTS
3,152,953 10/1964 Strong et al. .................. 167/46
OTHER REFERENCES
 Applegate et al., U.S. Dept. of the Interior, Fish and Wildlife Service, Toxicity of 4,346 Chemicals to Larval, Lampreys and Fishes, Special Scientific Report— Fisheries No. 207, March 1957, pages 1– 6,9,102 and 103
 Muncy et al., Chem. Abs., Vol. 61, 6309d, 1964

Primary Examiner—Albert T. Meyers
Assistant Examiner—Allen J. Robinson
Attorneys—Ernest S. Cohen and William S. Brown ABSTRACT: Undesirable fish are killed by exposing them to an aqueous solution or dispersion of a toxicant composition comprising a combination of antimycin A and naled.

FISH TOXICANT COMPOSITIONS AND METHOD OF USING THEM

Control or eradication of unwanted fish species, such as the black bullhead, is essential to efficient fishery management and waterfowl management in many areas. For example, killing of undesired species of fish in lakes, ponds, streams, etc. is often desirable prior to restocking with desired species of fish.

Various toxic materials, such a antimycin A (U.S. Pat. No. 3,152,953), have previously been used for killing undesirable fish. However, such prior art toxicants have generally suffered from one or more deficiencies such as the requirement of uneconomical amounts of toxicant, resistance of specific types of fish, particularly bullheads, to the toxicant, repelling of the fish by the toxicant, etc.

It has now been found that a combination of antimycin A and naled is synergistic and results in a highly effective and efficient toxicant composition. Preparation and use of antimycin A are disclosed in U.S. Pat. No. 3,152,953. Naled is the common name for 1, 2-dibromo-2, 2-dichloroethyl dimethyl phosphate, i.e., $(CH_3O)_2P(O)OC(Br)HCBr(Cl)_2$. Both compounds are insoluble in water and consequently stock solutions of technical grade materials are prepared by initially dissolving them in an organic water-miscible solvent such as methanol, ethanol, or acetone. Aqueous stock solutions of the compounds may then be prepared, if desired, by additions of the organic solvent solutions to water. In addition, a surfactant or wetting agent may be included in the composition to facilitate dispersion of the composition in water. The toxic compositions may then be applied to the body of water at the surface or subsurface.

Optimum concentrations of the two compounds will vary widely with the particular species of fish to be killed, since different species differ greatly in sensitivity to the toxicants. Water conditions, such as temperatures, hardness, pH and turbidity may also affect the optimum concentrations. In general, however, an effective concentration of the antimycin A will be in the range of about 0.008 to 10 p.p.b. (parts per billion), with the corresponding concentration of the naled being about 50 to 200 p.p.b. Generally, suitable ratios (by weight) of antimycin A to naled with be from about 0.0001:1.0 to 0.1:1.0.

The following examples will serve to more particularly illustrate the invention and its advantages.

EXAMPLES 1–10

These examples consisted of tests to demonstrate the effectiveness of the toxicant compositions of the invention against three species of fish, i.e., black bullheads, large mouth base and yellow perch. The tests were conducted in 5-gallon glass vessels containing 15 liters of reconstituted water ($NaHCO_3$—48 mg./l., $CaSO_4$—30 mg./l., $MgSO_4$—30 mg./l., $KCl$—2.0 mg./l.) at two temperatures, 12° and 17° C. The two compounds were added, in an acetone solution, to prepare experimental mixtures having the concentrations, in parts per billion, given in table 1. Compound efficacy, individually or combined, was found by determining the concentrations that were lethal for all the fish ($LC_{100}$) used over a 96-hour exposure period. Results are given in table 1.

As will be seen from table 1, yellow perch were the most sensitive to the antimycin A-naled combination and all succumbed in 96 hours to solutions containing 0.008 p.p.b. or 0.01 p.p.b. of antimycin A and 80 p.p.b. of naled.

Largemouth bass were intermediate in sensitivity and the 96-hour $LC_{100}$ for 240 fish was 0.02 p.p.b. of antimycin A and 60 p.p.b. of naled.

Black bullheads were killed in four tests at 12° C. by combinations of compounds consisting of 10 p.p.b. of antimycin A and either 100 p.p.b. or 200 p.p.b. naled. In warmer water (17° C.) smaller amounts of each chemical produced 96-hour $LC_{100}$'s.

Most significant, however, was the synergism of the two compounds that was exhibited in all of the tests. It is apparent from the data of table 1 that the effective concentration of each compound when the two were used in combination was substantially less than the effective concentration when either of the two compounds was used alone. For example, 10 p.p.b. of antimycin A plus 100 p.p.b. of naled killed black bullheads within 96 hours at 12° C. Singly, 80 or 100 p.p.b. antimycin A or 2,000 p.p.b. of naled were required to kill this species under the same conditions. Similar synergistic effects were shown in the case of largemouth bass and yellow perch, as is evident from table 1.

TABLE 1
Effects of antimycin A and naled on three species of fish in 96-hour bioassays at 12 and 17° C.

| Species of fish | Bio-assay number | Number of fish | Temperature (° C.) | $LC_{100}$'s expressed in p.p.b. | | |
|---|---|---|---|---|---|---|
| | | | | Antimycin A alone | Naled alone | Antimycin A/naled |
| Black bullhead | 1 | 120 | 12 | 80 | 2,000 | 10/200 |
| | 2 | 120 | 12 | 80 | 2,000 | 10/100 |
| | 3 | 120 | 12 | 100 | 2,000+ | 10/100 |
| | 4 | 120 | 12 | 100 | 2,000 | 10/100 |
| | 5 | 120 | 12 | 80+ | 1–500 | 9/80 |
| | 1 | 120 | 17 | 60 | 1,500 | 6/80 |
| | 2 | 120 | 17 | 40 | 1,500 | 5/200 10/40 |
| Largemouth bass | 1 | 240 | 12 | 0.4 | 800+ | .02/60 |
| Yellow perch | 1 | 240 | 12 | .06+ | 400+ | .01/80 |
| | 2 | 240 | 12 | .08 | 700 | .008/80 |

What is claimed is:

1. A method for killing undesirable fish from the group consisting of black bullheads, largemouth bass and yellow perch comprising contacting the fish with an effective amount of an aqueous solution of a combination of (1) antimycin A and (2) 1,2-dibromo-2,2-dichloroethyl dimethyl phosphate; the weight ration of (1) to (2) being, for black bullheads from 0.025/1.0 to 0.25/1.0, for largemouth bass 0.003/1.0 and for yellow perch 0.0001/1.0.

2. The method of claim 1 in which the antimycin A and the 1,2-dibromo-2,2-dichloroethyl dimethyl phosphate are in solution in a water-miscible organic solvent.